Patented Aug. 5, 1947

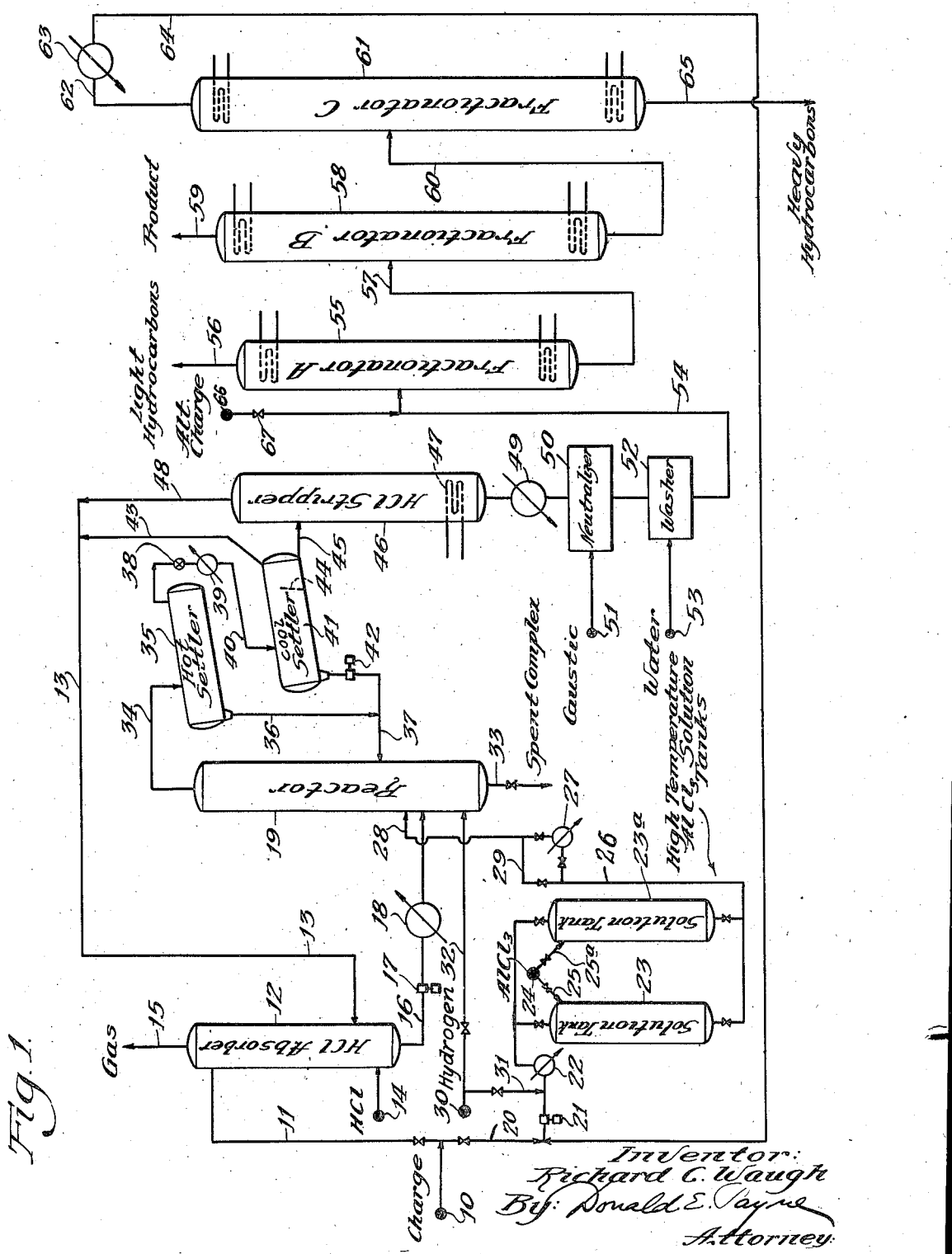

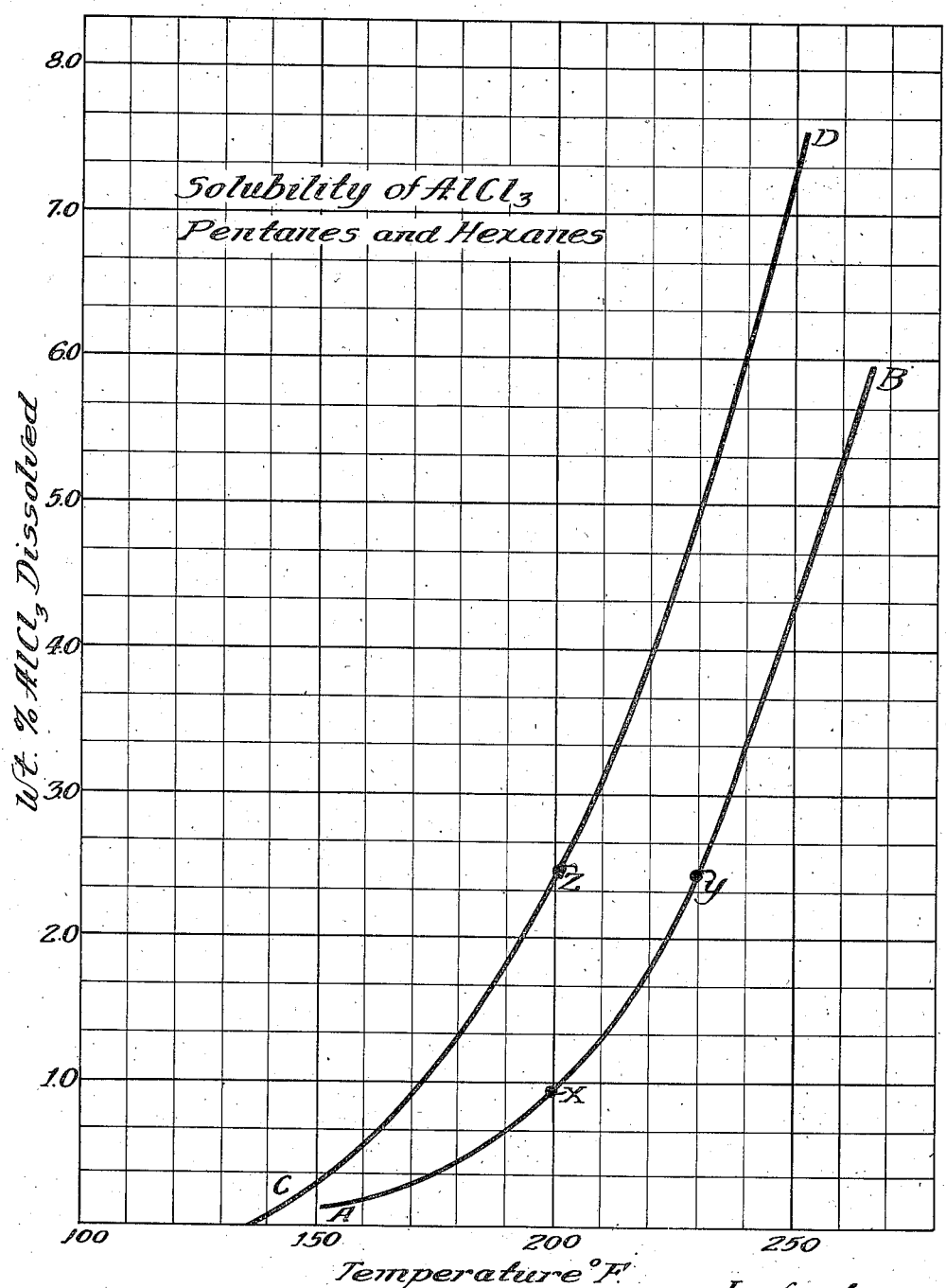

2,425,074

UNITED STATES PATENT OFFICE 2,425,074

HYDROCARBON CONVERSION WITH FRIEDEL-CRAFTS TYPE CATALYST

Richard C. Waugh, Hammond, Ind., assignor to Standard Oil Company, Chicago, Ill., a corporation of Indiana Application August 16, 1943, Serial No. 498,808

5 Claims. (Cl. 260—683.5)

1

This invention relates to reactions with Friedel-Crafts type catalysts and it pertains more particularly to improved methods and means for introducing catalyst into continuous light normally liquid paraffinic hydrocarbon reaction systems and improved method and means for preventing catalyst carry-over from such systems.

The invention is generally applicable to conversion processes employing both Friedel-Crafts type catalysts and paraffinic hydrocarbons of the light gasoline boiling range and it is particularly useful in processes for the isomerization, disproportionation or alkylation of said light paraffinic hydrocarbons. In continuous isomerization systems for example, a vexatious problem has been that of introducing make-up catalyst to the system in amounts sufficient to maintain optimum catalyst activity but insufficient to cause catalyst losses with the product stream. An object of my invention is to provide a solution to this problem. A further object is to simplify the step of adding make-up catalyst and the equipment required therefor. A further object is to increase the efficiency and effectiveness of such isomerization systems. A further object is to obtain greater product yields per pass and greater product yields per unit of catalyst employed than has heretofore been possible. Other objects will be apparent as the detailed description of this invention proceeds.

It is known that aluminum chloride is appreciably soluble in hydrocarbons such as pentane and hexane and that the solubility increases rapidly with rise in temperature. I have discovered, however, that it is possible to maintain in hydrocarbon solution at a given temperature, an amount of aluminum chloride substantially in excess of that indicated by the "solubility" of said aluminum chloride at said temperature. For example, if pentanes or other paraffinic light naphtha hydrocarbons are saturated with aluminum chloride at 250° F. and then cooled to 212° F., said hydrocarbons will contain about 3½% by weight of dissolved aluminum chloride as compared to only 1½% by weight which is the maximum which can be dissolved when the 212° F. temperature is approached from the low side. This phenomenon does not appear to be one of simple supersaturation because the increased amount of dissolved aluminum chloride stays in solution even when permitted to stand in contact with an undissolved aluminum chloride for a long period of time. I am unable to account for this phenomenal increase in the amount of aluminum chloride which can thus be held in light paraffinic hydrocarbon solution but a pos-

2 sible explanation is that aluminum chloride molecules are in some state of association with each other at lower temperatures, that the molecules tend to become more dissociated at higher temperatures and when the dissociated molecules are actually dissolved in the paraffinic solvent they tend to remain dissolved even when the solution is cooled to lower temperatures at which the normal association would prevent solution.

In isomerization and other hydrocarbon conversion processes employing Friedel-Crafts type catalysts there is a pronounced tendency toward aluminum chloride complex formation and this complex itself may serve as the active catalyst for effecting the conversion provided that it is maintained at proper activity. I have discovered that up to a rather critical point aluminum chloride is preferentially soluble in the complex. The heat of hydrolysis of the complex may be employed to determine the point at which the remarkable solubility of aluminum chloride in the complex is no longer effective for selectively removing substantially all dissolved aluminum chloride from the light paraffinic hydrocarbon solution. Thus, at 212° F., where the normal aluminum chloride solubility in pentane is about 1½% by weight and where as much as 3½% aluminum chloride may be dissolved in pentane in accordance with my invention, I have found that at 212° F., a complex which has a heat of hydrolysis below about 380 to 400 calories per gram will selectively take up aluminum chloride from the solution so that the total amount of aluminum chloride remaining in the hydrocarbon will not substantially exceed about .01% by weight. At higher heats of hydrolysis it will be found that substantial amounts of aluminum chloride will remain in the hydrocarbon solution in spite of thorough contact with a large amount of complex.

Instead of employing heat of hydrolysis as a criterion I may employ the percent of bound hydrocarbon in the complex. When the complex contains at least 23% by weight of bound hydrocarbon it selectively removes substantially all dissolved aluminum chloride from a light hydrocarbon solution at 212° F. but when the complex contains materially less than 23% of bound hydrocarbon in its composition, appreciable amounts of aluminum chloride will remain in the paraffin hydrocarbon solution. Thus a saturated pentane solution of aluminum chloride which has been contacted with a complex containing only about 20% or less of bound hydrocarbon may give an effluent stream which contains a hundred times as much dissolved aluminum chloride as the effluent stream obtained by contacting at the same temperature with a complex containing 30% or more of bound hydrocarbon.

My invention is based on these newly discovered phenomena and on the further phenomena regarding complex formation itself by reaction of aluminum chloride with hydrocarbon. While complex formation is desirable in the conversion zone itself it is undesirable in solution tanks wherein make-up aluminum chloride is being dissolved in incoming charging stock. Obviously the solution rate is markedly diminished if the surfaces of solid aluminum chloride become coated with gummy films of complex. Complex formation tends to increase with increases in temperature. I have found, however, that complex formation in the solution tanks may be substantially avoided with a hexane or heavier feed by operating said tanks under substantial hydrogen pressures, particularly when care is taken to prevent the introduction of hydrogen chloride into said solution tanks and when that portion of the charging stocks which is passed through the solution tanks is previously treated to remove objectionable complex-forming material. While the absence of hydrogen chloride is particularly important when charging stocks heavier than pentanes, even hydrogen chloride may be tolerated in the absence of materials heavier than pentanes if a substantial hydrogen pressure is maintained in the solution tanks.

In practicing my invention I maintain the activity of an aluminum halide-hydrocarbon complex catalyst by introducing make-up aluminum halide such as aluminum chloride, aluminum bromide or other active metal halide dissolved in a portion of the paraffinic light hydrocarbons which are introduced into the reaction zone. In order to obtain the necessary amount of catalyst in solution I may effect solution formation at a higher temperature than the solution utilization temperature and under a pressure sufficient to maintain liquid phase conditions. I may then cool the resulting solution thereby obtaining the incorporation of about twice as much catalyst in the hydrocarbons as would otherwise be possible. This higher temperature solution step followed by cooling is particularly important in those cases wherein a part of the charging stock must be employed for absorbing hydrogen chloride from recycled gases so that only a relatively small amount of the total hydrocarbons are available for the preparation of catalyst solutions.

In order to prevent complex formation in the solution tank I may operate said tank under a hydrogen pressure and I may employ in said solution tank a portion of the charge which has previously been treated for the removal of objectionable complex-forming materials. For operation at 212° F. the rate of catalyst addition to the reactor is regulated to maintain a heat of hydrolysis below about 380 calories per gram and certainly below about 400 calories per gram of complex. In other words, I insure that the complex will contain at least about 23% of bound hydrocarbon in its composition. By this means I may operate an isomerization or other conversion process continuously for long periods of time with maximum conversions per pass and maximum yields per unit of catalyst. The introduced active metal halide is selectively taken up by the complex in the conversion zone so that the effluent product stream from the conversion zone contains a negligible amount of dissolved catalyst, for example about 0.01% in the case of aluminum chloride at a temperature of 212° F.

The invention will be more clearly understood from the following detailed description of a specific example thereof read in conjunction with the accompanying drawings which form a part of this specification and in which:

Figure 1 is a schematic flow diagram of a process for isomerizing light paraffinic hydrocarbons such as pentane, hexane, etc. and Figure 2 is a chart illustrating the remarkably increased amounts of aluminum chloride which can be dissolved in light naphtha hydrocarbons such as pentanes and hexanes when the solution temperature is approached from the high temperature side rather than from the low temperature side.

Referring to Figure 1, the charging stock for the isomerization process may be a hexane cut of a virgin light naphtha. Alternatively, the charge may be normal pentane, normal hexane, methyl pentanes, etc. from any source whatsoever but said stocks should not contain more than about 2 or 3% of aromatics and they should be substantially free from olefins. About ½ to ¾ of the charge introduced from source 10 may be passed by line 11 to absorber tower 12 for absorbing hydrogen chloride introduced in recycle gases from line 13 and make-up hydrogen chloride introduced from source 14, any unabsorbed gases being vented through line 15. The hydrogen chloride solution leaves the base of absorber through line 16 and is introduced by pump 17 through heater 18 to a low point in reactor tower 19. The amount of hydrogen chloride thus introduced should be about 2 to 10% for example about 5 or 6% by weight of the total hydrocarbon charging stock introduced into the reactor.

The remaining one-fourth to one-half of the charging stock may be introduced by line 20 through pump 21 and heater 22 into solution tank 23 or 23a. Such tanks may be of any desired size or shape and may be provided with stirring or agitating means (not shown) but it is usually sufficient to employ simple cylindrical towers packed with lump aluminum chloride introduced from source 24 by lines 25 and 25a. Downflow through the solution tanks is advantageous since the hydrocarbon stream will serve to flush any complex formed out of saturator and carry it into the reactor proper. By employing two solution tanks, one may be on stream under pressure while the other is being charged with solid aluminum chloride. These solution tanks may be steam jacketed or provided with other conventional heating means in order to insure the necessary high temperature employed for effecting solution or alternatively they may simply be well insulated and the heat may be supplied by preheating that portion of the charging stock that is passed therethrough. The resulting solutions are passed from the solution tanks through line 26 and cooler 27 and line 28 to reactor 19. Instead of employing a cooler 27 I may employ the reactor itself as a cooler thereby minimizing the load on heat exchanger 18 and in this case I may by-pass cooler 27 by means of line 29. In order to prevent complex formation in the solution tanks I may pass at least a part of the hydrogen from source 30 through line 31 to that portion of the charge entering the solution tanks, the remainder of the hydrogen being introduced through line 32 directly to a low point of reactor tower 19.

The solution tanks may be operated at a temperature which is higher than the temperature in reactor 19 and said tanks may operate within the approximate temperature range of about 150° to 300° F. or higher. For example, when the reactor is operated at about 212° F. the solution tanks may be operated at about 250° F. It is not always necessary, however, for the solution tanks to be at higher temperatures than the reactor since many features of the invention are applicable with solution temperatures as low as 200° F. or even 150° F. The pressure maintained in the solution tanks should be at least sufficient to maintain the hydrocarbons in liquid phase and in this particular example a full reaction pressure of approximately 850 pounds per square inch is maintained.

It is essential not only that the temperature and amount of solvent charged to the solution tanks be carefully controlled but also that the time and extent of contact in the solution tanks be adequate for incorporating the desired amount of catalyst in the hydrocarbon solution. Generally speaking, the space velocity through the solution tank should be not more than about 1 volume of liquid hydrocarbon per hour per volume of solid aluminum chloride in the tank and the aluminum chloride should be of sufficiently small particle size to present a large surface area, 10 mesh to ¼ inch particles being satisfactory in large commercial installations. If higher space velocities are employed or if the free surface area of aluminum chloride is diminished because of unduly large particle size or the formation of complex, then the amount of aluminum chloride dissolved may decrease to about ½ or even to as low as ⅓ the amount indicated by the solubility charts in Figure 2. The use of hydrogen and the pretreatment of hydrocarbons entering the solution tanks are therefore important in insuring the rapid solution rate and in enabling the operation of the solution tank at the lowest possible temperature. A reasonable excess of solid aluminum chloride should always be maintained in the solution tanks. This can be accomplished by filling one solution tank with solid aluminum chloride while another solution tank is on stream.

The total amount of dissolved aluminum chloride which is introduced into the reactor in this example is about .5 pound per barrel of total stock charged. The amounts required will vary with particular charging stocks and may be less for example in the case of normal pentane than in the case of a hexane or methyl hexane. The amount in any particular case can readily be determined either by determining the heat of hydrolysis of the complex in reactor or by analyzing such complex to determine its hydrocarbon content. The make-up aluminum chloride should be added at such a rate as to maintain the heat of hydrolysis of the catalyst in the general vicinity of about 300 to 380 calories per gram but not substantially in excess of about 380 calories per gram. On a composition basis the hydrocarbon content of the catalyst should be maintained within the approximate range of about 23 to 40% but it should not be substantially less than about 23%. The exact limits which may be approached will vary somewhat from the values above depending upon reactor temperature. The limits given were determined at 212° F. however it will be found that operation at temperatures up to 300° F. will not require greatly different operating limits. The precise temperature at which the solution tank should be operated can readily be determined from the data plotted in Figure 2.

Referring more specifically to Figure 2, it will be noted that if the solution tanks are maintained at 200° F. less than 1% by weight of aluminum chloride can be dissolved in the hydrocarbon regardless of the length of time allowed for obtaining said solution (point X on curve AB). However, if the incoming solution is heated to about 230° F. (point Y on curve AB) and given a sufficiently long period of contact with an excess of aluminum chloride at said temperature and then cooled to 200° F. (point Z on curve CD) about 2.5% by weight of aluminum chloride may be dissolved in the hydrocarbon. The remarkable fact is that this large amount of dissolved aluminum chloride apparently stays in solution even after prolonged contact with an excess of undissolved aluminum chloride. By effecting the solution at a higher than desired solution temperature and then cooling back to desired solution temperature I thus incorporate more than twice as much aluminum chloride into the solution as could otherwise be incorporated. Curve AB represents the maximum amount of aluminum chloride that can be dissolved in such hydrocarbons as pentanes, hexanes and light naphtha when the solution temperature is approached from the low temperature side. Curve CD represents the amounts of aluminum chloride that can be dissolved when the solution temperature is approached from the high temperature side, i. e., a temperature at least 25 to 30 degrees higher than the desired solution temperature. By heating to a higher-than-desired solution temperature and then cooling back to desired solution temperature I may incorporate an adequate amount of catalyst material into the hydrocarbons to take care of the entire make-up requirements of the system and I thus solve the vexatious problem of make-up catalyst introduction which has heretofore confronted the art.

The reactor in this case is a simple cylindrical vessel about 30 feet in height and of such diameter that when about two-thirds or three-fourths filled with aluminum chloride-hydrocarbon complex the space velocity will be of the order of about .4 to 4, for example about 1, volume of liquid charging stock per hour per volume of complex in the reactor. It is preferably operated at a temperature within the range of 150 to 300° F., e. g., about 212° F. and under a pressure of the order of 500 to 1500 pounds per square inch, e. g., about 850 pounds per square inch. Hydrogen is introduced from source 30 at the rate of about 50 to 300 cubic feet per barrel of stock charged, e. g., about 180 cubic feet per barrel. The aluminum chloride solution is preferably introduced into the reactor at a separate point from that at which the hydrogen chloride solution is introduced and a considerable portion of the hydrogen is preferably introduced at a low point in the reactor in order to strip out hydrogen chloride and hydrocarbons from spent complex which is removed either continuously or periodically through line 33.

While a single reactor has been illustrated it should be understood that a plurality of reactors may be employed, the first for example being operated at a temperature of the order of 250 to 300° F., e. g., 275° F. and the second at a temperature of the order of 200 to 250° F., e. g., 225 or 212° F. While a tower-type reactor is preferred with a complex catalyst depth of at least about 5 feet and preferably about 20 to 30 feet, it should be understood that a tubular reactor may be employed or a stirred reactor or a reactor of any other known type.

Reaction products separate from the catalyst complex in the upper part of reactor 19 and are taken overhead through line 34 to the hot settler 35. The entrained catalyst complex settles out and is returned to the reactor through lines 36, 37. The product stream then passes through pressure reducing valve 38, cooler 39 and line 40 to cool settler 41 wherein additional catalyst material may settle out and be returned by pump 42 and line 37 to reactor 19. Gases may leave the top of cool settler 41 through line 43 to line 13 which leads to the base of absorber tower 12. The liquid product stream flows over weir 44 and is withdrawn through line 45 to hydrogen chloride stripper 46 which is provided with a suitable heating means 47 at its base. Hydrogen chloride and lighter gases are stripped out of the product in stripper 46 and returned by lines 48 and 13 to absorber tower 12.

The stripped bottoms pass through cooler 49 to neutralizing system 50 wherein they are scrubbed with caustic introduced through source 51. The caustic treated product may then pass to a washing system 52 wherein neutralization products are scrubbed out by water introduced from source 53. The water washed product may then pass through line 54 to fractionator A which in this case may be depentanizer 55, the pentanes and lighter hydrocarbons being taken overhead through line 56. The bottoms from tower 55 pass through line 57 to fractionator B which in this case is neohexane tower 58, the neohexane product being removed from the top of this tower through line 59. The bottoms from tower 58 pass through line 60 to fractionator C which in this case is a column 61 which separates methyl pentanes and normal hexane from heavier naphthenic hydrocarbons. The methyl pentanes and normal hexane are taken overhead through line 62, condensed in cooler 63 and recycled to the conversion system through line 64. The heavier naphthenic hydrocarbons are withdrawn through line 65 and may serve as charging stock for a dehydroaromatization system or be used as solvents or motor or aviation fuel components.

The fractionation system hereinabove described is schematic and illustrative only and it should be understood that each column or tower is provided with suitable reflux means at its top and reboiler means at its base. If desired, additional columns may be employed for debutanizing the product, separating normal pentane from isopentane, etc. The fractionation system per se forms no part of the present invention and any desired type of fractionation system may be used. The fractionation system may simultaneously fractionate a part or all of the charging stock, i. e., charging stock may be introduced from source 66 and line 67 to column 55 instead of or in addition to the charge introduced from source 10.

In the specific example hereinabove described the charging stock was a hexane cut of paraffinic virgin light naphtha and the desired product was neohexane although the product stream likewise usually contains smaller amounts of cyclopentane and other hydrocarbons. The invention is equally applicable to a pentane-hexane charging stock in which case the isopentane and neohexane streams may be separately recovered by suitable fractionation or the product stream may contain pentanes (chiefly isopentane) as well as neohexane. When heptanes are isomerized in such a system temperatures may be slightly lower, hydrogen pressures somewhat higher and the recycled stream should consist essentially of methyl hexanes, normal heptanes and naphthenes being withdrawn from the system through line 65.

When the process is employed for converting normal pentane to isopentane, the hydrogen requirement may be substantially reduced and in fact it may be practically eliminated particularly when the proper amount of a cracking inhibitor is admixed with the charging stock or separately introduced into the reactor. An amount of aromatic within the approximate range of .02 to 2 or 3%, for example about .5%, is a very effective cracking inhibitor best results being obtained by admixing about .5% of benzol with the charging stock before it is introduced into the reactor. Naphthenes may likewise serve as cracking inhibitors when employed in amounts within the approximate range of 1 to 20%, for example about 5 to 10%. Avoiding the necessity of using hydrogen in the reactor makes possible the operation of said reactor at lower pressures but the pressure should be sufficient to maintain substantially liquid phase conversion conditions. Even when no hydrogen is employed in the reactor it is desirable, though not absolutely essential, to maintain a hydrogen pressure in solution tanks 23 and 23a in order to prevent or minimize complex formation therein. For this purpose hydrogen pressures may be of the order of 50 to 500 pounds per square inch, for example, about 200 pounds per square inch, and since little or no hydrogen is actually consumed in the solution tank, it is only necessary to add the amount of hydrogen which is continuously dissolved in the hydrocarbons leaving the solution tank. For such operations with down flow saturators, a hydrogen atmosphere may be maintained in the upper part of the solution tank above the liquid interface in such manner as to contact the hydrocarbon before it reaches the aluminum chloride. The dissolved hydrogen in the hydrocarbon will then prevent complex formation.

For butane isomerization and likewise for pentane isomerization when .5% of benzol or equivalent amount of other cracking inhibitor is employed, the conversion system may be considerably simplified. Absorber tower 12 may be eliminated and instead of employing hot and cold settlers a single settler may be employed and operated at a pressure of the order of about 200 pounds per square inch and at a temperature of about atmospheric to 100° F. Under these conditions most of the hydrogen chloride is dissolved in the liquid product and any minor amounts of lighter gases may be vented directly from the settler without appreciable hydrogen chloride losses. Hydrogen chloride in this case may be recycled directly from the top of the stripper to the charging stock entering the base of the reactor. The elimination of the necessity of using an absorber makes available a greater portion of the charging stock to serve as a solvent for make-up aluminum chloride so that in this case solution tanks 23 and 23a may operate within the lower portion of their operating temperature range and the tendency toward complex formation in these solution tanks is thereby materially reduced. When charging pentanes or butane, the use of hydrogen allows the toleration of substantial amounts of hydrogen chloride in the feed to the saturator without excessive complex formation.

Where the amount of recycled hydrocarbon permits, it is desirable that such recycled hydrocarbon be introduced into the solution tanks instead of fresh charge. The recycled hydrocarbon has already been contacted with catalyst and is thus free from undesirable complex-forming materials which may be present in untreated flash charging stock. Thus all of the fresh charging stock in the example hereinabove described may be introduced through line 11 to absorber 12 and the recycled hydrocarbons from line 64 may serve as the sole source of hydrocarbons for passage through solution tanks 23 and 23a.

In any isomerization system it is important to prevent dissolved aluminum chloride from being taken overhead with a product steam and to the settlers, stripper, etc. Such dissolved aluminum chloride carry-over not only results in expensive catalyst losses but it also results in various corrosion and line-plugging problems, particularly in that part of the system which includes the settler and the stripper and lines communicating therewith. In order to prevent such carry-over I regulate the introduction of dissolved aluminum chloride into the reactor so as to maintain a heat of hydrolysis of aluminum chloride hydrocarbon complex in the reactor within the approximate range of 300 to 380 calories per gram. In other words, I maintain the catalyst at a highly active level by preventing its hydrocarbon content from exceeding about 40% but I maintain its hydrocarbon content at at least about 23% in order that it may remove substantially all of the aluminum chloride from the introduced solution so that a negligible amount of aluminum chloride, i. e., an amount of the order of about .01% is carried over in solution in the effluent product stream. The remarkable tendency of an aluminum chloride complex to combine with aluminum chloride and thus take it out of solution makes it important to prevent the formation and accumulation of any appreciable amounts of complex in solution tanks themselves; hence the importance of preventing the formation or introduction of hydrogen chloride in solution tanks, when charging hexanes or higher, and maintaining the solution tanks under hydrogen pressure in order to prevent complex formation.

While I have described a specific example of my invention and specific operating conditions in connection therewith, it should be understood that the invention is not limited to this example nor to the described conditions since numerous other modifications and alternative operating conditions will be apparent to those skilled in the art from the above detailed description.

I claim:

1. In a method of adding make-up active metal halide to a continuous conversion system employing a Friedel-Crafts catalyst the improvement which comprises dissolving said active metal halide in a light normally liquid paraffinic hydrocarbon at high temperature within the range of about 150° to 300° F. and under a hydrogen pressure for inhibiting complex formation and then cooling the resulting solution to a lower temperature which is at least about 25° lower than said high temperature in order to obtain in said solution a substantially larger amount of dissolved active metal halide than could be incorporated therein if the solution had been effected at said lower temperature.

2. The method of claim 1 wherein the high temperature is at least about 200° F.

3. The method of operating an active metal halide hydrocarbon isomerization system employing an active metal halide hydrocarbon complex which method comprises maintaining the hydrocarbon content of said active metal halide-hydrocarbon complex within the approximate range of 23 to 40% by weight by adding thereto a solution of active metal halide in a light normally liquid paraffinic hydrocarbon which solution is formed at an elevated temperature and pressure in the substantial absence of deleterious complex-forming materials and under substantial hydrogen pressure.

4. The method of claim 3 wherein the solution is formed under a hydrogen pressure within the approximate range of 50 to 500 pounds per square inch.

5. The method of incorporating a larger amount of aluminum chloride in a light normally liquid paraffinic hydrocarbon at a particular temperature within the approximate range of 150 to 250° F. than could be introduced into said hydrocarbon by prolonged contact and intimate mixing of said hydrocarbon with the aluminum chloride at said particular temperature which method comprises, contacting said hydrocarbon in the absence of complex-forming materials and under a substantial hydrogen pressure with a large excess of aluminum chloride at a temperature at least 25° F. higher than said particular temperature and for a period of time sufficient to effect substantial saturation and subsequently cooling said solution to said particular temperature.

RICHARD C. WAUGH.

REFERENCES CITED

The following references are of record in the file of this patent:

UNITED STATES PATENTS

| Number | Name | Date |
|---|---|---|
| 2,266,012 | d'Ouville et al. (A) | Dec. 16, 1941 |
| 2,308,560 | Carmody et al. | Jan. 19, 1943 |
| 2,338,711 | d'Ouville et al. (B) | Jan. 11, 1944 |
| 2,338,472 | van Peski | Jan. 4, 1944 |
| 2,342,922 | Danforth | Feb. 29, 1944 |
| 2,390,883 | Iverson | Dec. 11, 1945 |

Certificate of Correction

Patent No. 2,425,074.                                    August 5, 1947.

RICHARD C. WAUGH

It is hereby certified that errors appear in the printed specification of the above numbered patent requiring correction as follows: Column 3, line 69, for "precess" read *process*; column 5, line 36, for "chloide" read *chloride*; column 6, line 17, for "alumnum" read *aluminum*; column 9, line 14, for "steam" read *stream*; column 10, line 21, claim 3, for "paraffinc" read *paraffinic*; and that the said Letters Patent should be read with these corrections therein that the same may conform to the record of the case in the Patent Office.

Signed and sealed this 16th day of September, A. D. 1947.

[SEAL]

THOMAS F. MURPHY,
*Assistant Commissioner of Patents.*